June 20, 1939. R. V. ANDERSON 2,162,991
CHARCOAL PRODUCTION APPARATUS AND PROCESS
Filed May 22, 1936
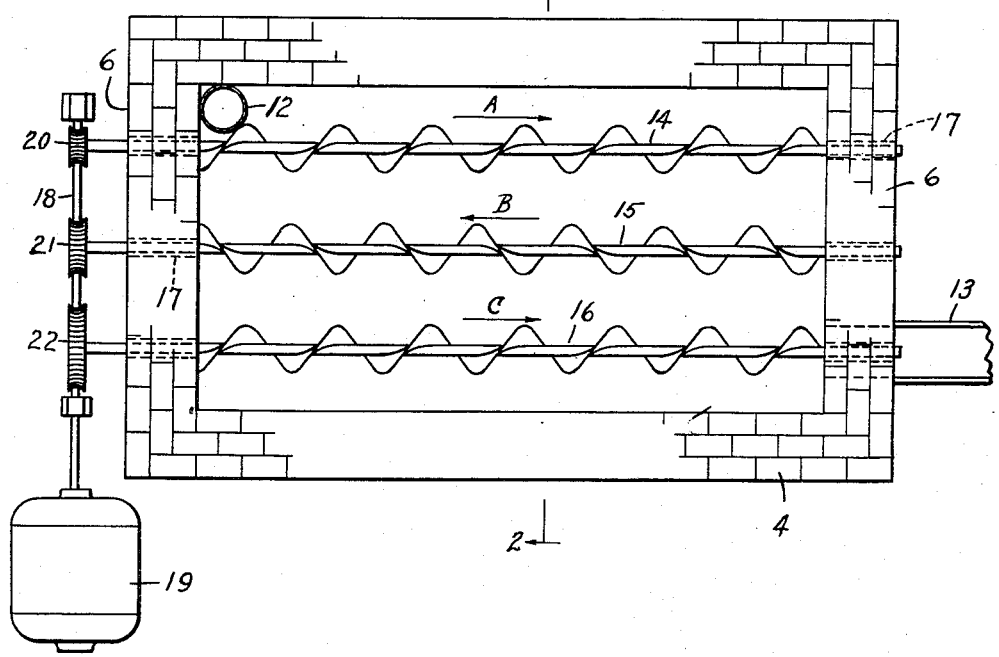
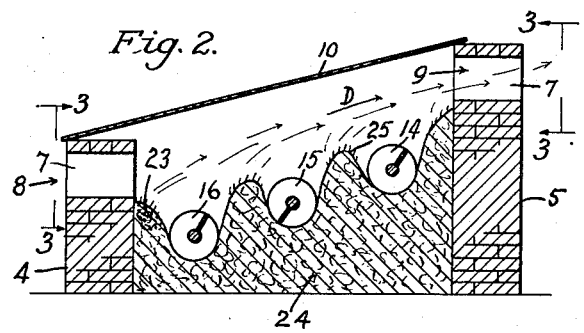
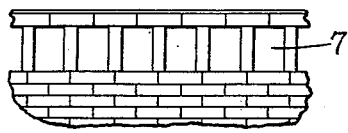
INVENTOR.
Rea Van Anderson
BY Carlos G. Stratton
ATTORNEY.

Patented June 20, 1939

2,162,991

UNITED STATES PATENT OFFICE 2,162,991

CHARCOAL PRODUCTION APPARATUS AND PROCESS

Rea Van Anderson, Los Angeles, Calif.

Application May 22, 1936, Serial No. 81,161

8 Claims. (Cl. 202—19)

REISSUED
SEP 1 0 1940

My invention relates to an apparatus and process for the production of charcoal. An important object of my invention is to provide an apparatus and process that will produce charcoal from carbonaceous material in a relatively short time and still afford a continuous process.

Another object is to produce such an apparatus and process in which the distillation step does not have to be carried on in a retort in the absence of air.

The invention also comprises novel details of construction and novel combinations and arrangements of parts, which will more fully appear in the course of the following description.

In the drawing, like reference characters designate similar parts in the several views.

Figure 1 is a plan view of an embodiment of my invention.

Figure 2 is a section taken on the line 2—2 of Figure 1.

Figure 3 is a broken elevation looking in the direction of either of the lines 3—3 of Figure 2.

Referring more in detail to the drawing, the reference numerals 4 and 5 designate side walls and the numeral 6 designates end walls of a retort for the distillation of carbonaceous materials for the production of charcoal. The side wall 5 is built higher than the side wall 4 and the end walls 6 slope downward from the one to the other. The walls are preferably of brick, and in the upper courses of the side walls openings 7 are left between the bricks to provide an upwardly inclined draft. Openings 7 in the wall 4 provide air inlet 8 and the openings 7 in the wall 5 provide discharge outlet 9 for spent gases of combustion. A sloping top 10 is preferably laid upon the walls, whereby it is inclined upwardly from the inlet 8 to the outlet 9.

An inlet conduit for feeding material to the retort is indicated at 12, and a discharge U-trough for finished charcoal is indicated at 13.

Mounted lengthwise within the retort is a series of helical conveyors 14, 15 and 16. These conveyors are journaled in the end walls 6, as suggested at 17. The conveyors are driven by a main shaft 18 operated by a motor 19. The conveyors 14, 15 and 16 are respectively operated by the shaft by means of worm gears 20, 21 and 22 and worms (not shown) on the shaft. The gear 20 is smaller than the gear 21, and the gear 21 is in turn smaller than the gear 22. By this means, the conveyor 14 is rotated the fastest, the conveyor 15 next fastest, and the conveyor 16 the slowest. The conveyor 15 is connected to drive material in a direction opposite to that in which material is driven by the conveyors 14 and 16, as indicated by the arrows A, B and C in Figure 1.

In the operation of my invention, feed material is introduced into the retort or furnace by means of the conduit 12. The feed material may be any carbonaceous material; e. g., agricultural by-products such as walnut shells, etc. The feed material preferably consists of small pieces, and not long pieces of wood for instance.

To initially start operation, however, the top 10 may be removed and a quantity of feed material poured into the retort, to fill the bottom thereof. The material is then ignited. For economy, I prefer to pour a quantity of distillate or other inflammable material along the material adjacent the wall 4, as suggested at 23. The distillate is lit, which assists in igniting the material in the retort. The flames spread throughout the retort by means of the volatile, inflammable gases given off by the heated material.

The flames and heat effect a current of heated air and gases of combustion from the inlet 8 to the outlet 9, as suggested by the arrows D in Figure 2. When the material that was initially placed in the retort has had its volatile gases driven off and has been substantially reduced to charcoal, and while it is still glowing, feed material is introduced at 12, which is adjacent the highest conveyor.

The three conveyors are driven by the single drive shaft 18 at different speeds, due to the relative sizes of the gears 20, 21 and 22. The conveyor 14 is driven most rapidly since it must handle the most material. In the operation of the present invention, for every three (3) tons of feed material that is introduced into the retort, only about one (1) ton of finished charcoal is discharged at the trough 13. The other two (2) tons escape into the atmosphere during the production of the finished product. Therefore, the conveyors 14, 15 and 16 have progressively less work to do, and their speed of rotation and their capacity may and is, therefore, correspondingly slowed down.

Rotation of the conveyors in the charcoal bed 24 causes each conveyor to form its own elongated bed, whereby ridges 25 of material form between the conveyors. It will be noticed that a substantial portion of the circumference of each conveyor is enclosed in the charcoal bed, and since the charcoal acts as an insulation, the conveyors are protected from the intense heat in the retort, which considerably lengthens the period of usefulness of the conveyors.

The material builds up at the end of the screw conveyor 14. This built up material falls over into the sphere of the conveyor 15. At the end of the conveyor 15, the material builds up and falls over into the sphere of the conveyor 16, since the latter conveyor is lower than 14. Therefore, no mechanical means need be provided for moving the material from one conveyor to another.

After the material has traversed the retort from end to end three times, by means of the oppositely operating conveyors, the material has been reduced to charcoal and the finished product is discharged into the trough 13, for sacking, or use.

It is to be understood without further illustration that an equivalent of the different gear ratios, described hereinbefore, would be to correspondingly diminish the diameter of the conveyors, and drive them at the same number of revolutions per minute.

It is thought clear from the foregoing that the operation is continuous and will continue to operate without further ignition for the material generates its own heat from the gas it produces.

The process is one of distillation for the heat from the burning of the volatile, inflammable gases causes volatile gases to be expelled from adjacent material.

The middle conveyor 15 may be either driven in a direction opposite to that of the other two conveyors, or the conveyor 15 may be threaded diametrically opposite.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. The method of making charcoal, comprising moving carbonaceous material capable of producing charcoal in a predetermined path, heating the carbonaceous material to expel volatile gases, igniting the volatile gases from the carbonaceous material, introducing feed material into said path at the head end, discharging charcoal from tail end of said path, and passing a current of air over the material across the width of the path.

2. Apparatus for the production of charcoal, comprising a non-combustible enclosing wall that is longer than its width, a top for the wall, screw conveyor means arranged lengthwise within the wall to move material progressively in the enclosure defined by the wall, there being feed inlet and discharge means arranged respectively at the head and tail of the path in which the conveyor means moves material, and there being air inlet and gas discharge means arranged in the sides of the enclosing wall to pass a current of air over material in the enclosure, across the width of the enclosure.

3. Apparatus for the production of charcoal, comprising enclosing means having non-combustible end walls and having non-combustible side walls of different heights, a plurality of helical conveyors arranged side by side within the enclosure and arranged substantially parallel with the side walls, and arranged for one of the conveyors to be a head conveyor and for another conveyor to be a tail conveyor, a top for the enclosure extending upward from the lower side wall to the higher one, there being a feed inlet adjacent the head conveyor and a charcoal discharge outlet adjacent the tail conveyor, and there being an air inlet in the lower side wall and a discharge outlet for volatile gases in the higher side wall, whereby an upwardly inclined draft is created crosswise of the conveyors, the conveyors being arranged in progressively higher horizontal planes from the lower side wall to the higher one, the head conveyor being at the uppermost plane, and the tail conveyor being at the lowermost plane, whereby material progresses downwardly.

4. Apparatus for the production of charcoal, comprising enclosing means having a non-combustible top and a non-combustible enclosing wall, a plurality of helical conveyors arranged side by side within the enclosure and arranged for one of the conveyors to be a head conveyor and for another conveyor to be a tail conveyor, the apparatus having a feed inlet for the head conveyor and having a discharge outlet for the tail conveyor, there being an air intake apart from the feed inlet, apart from the discharge outlet, and in proximity with one of the conveyors and there being a continuously open gas exhaust in the enclosing means apart from either the feed inlet or the discharge outlet, the gas exhaust being adjacent another conveyor and at a higher point than the air intake, a vertical plane extending from the air intake to the gas exhaust being at an angle to a vertical plane extending from the feed inlet to the discharge outlet and being at an angle to the length of the conveyors, whereby to create a draft across the conveyors.

5. Apparatus for the production of charcoal, comprising a non-combustible enclosing wall having air inlet and outlet means, screw conveyors arranged within the enclosure, means to operate adjacent conveyors to move material in different directions, blank portions of the wall being arranged at the discharge ends of the respective conveyors, to stop movement of material longitudinal of the respective conveyor, the apparatus being closed under each conveyor throughout the entire extent of each conveyor, whereby to pile up material at said blank wall portions, the receiving end of each conveyor, except the first, being adjacent the discharge end of the next preceding conveyor to receive material from that which is piled up against the respective wall portion at the discharge end of the next preceding conveyor.

6. Apparatus for the production of charcoal, comprising a non-combustible enclosing wall, a top for the wall, a plurality of helical conveyors arranged side by side within the enclosure at different elevations, there being a feed inlet adjacent the highest conveyor, and there being a charcoal discharge outlet adjacent the lowest conveyor, the conveyors lying in planes stepping down from the feed inlet to the discharge outlet, the apparatus having an air inlet adjacent the lowest conveyor and having a discharge outlet for volatile gases above the air inlet and adjacent the highest conveyor, a vertical plane extending from the air inlet to the gas outlet being at an angle to a direction that the conveyors are connected to move material.

7. The method of making charcoal, comprising moving carbonaceous material capable of producing charcoal in predetermined substantially parallel paths, moving the material successively from one path to the next, the direction of movement of the material in adjacent paths being in opposite directions, heating the carbonaceous material to expel volatile gases, igniting the volatile gases from the carbonaceous material, and passing a current of air transversely across said paths, in a direction from the last path traversed by the material toward the first path.

8. Apparatus for the production of charcoal, comprising a non-combustible enclosing wall having air inlet and outlet means, a top for the wall, a plurality of screw conveyors disposed side-by-side within the enclosure, the receiving end of each conveyor, except the first, being disposed to receive material from the discharge end of the next preceding conveyor, there being a feed inlet adjacent the first conveyor and there being a charcoal discharge outlet adjacent the last conveyor, driving means for the conveyors respectively, the conveyor adjacent the feed inlet in conjunction with its driving means having a greater capacity than the conveyor adjacent the discharge outlet considered in conjunction with its driving means, and means operatively connected with said driving means for driving the conveyor at the feed inlet at a speed to handle a greater capacity than the conveyor at the discharge outlet.

REA VAN ANDERSON.